US007867601B2

(12) United States Patent
Ikishima et al.

(10) Patent No.: US 7,867,601 B2
(45) Date of Patent: Jan. 11, 2011

(54) PRESSURE-SENSITIVE ADHESIVE TAPE

(75) Inventors: Shinsuke Ikishima, Ibaraki (JP); Hiroichi Ukei, Ibaraki (JP); Masakazu Morimoto, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 1295 days.

(21) Appl. No.: 11/184,261

(22) Filed: Jul. 19, 2005

(65) Prior Publication Data

US 2006/0019069 A1    Jan. 26, 2006

(30) Foreign Application Priority Data

Jul. 20, 2004    (JP)    ............... 2004-211775

(51) Int. Cl.
| | |
|---|---|
| *B32B 9/00* | (2006.01) |
| *B32B 33/00* | (2006.01) |
| *B32B 3/00* | (2006.01) |
| *B32B 3/28* | (2006.01) |
| *B32B 3/30* | (2006.01) |
| *B32B 7/12* | (2006.01) |
| *B32B 15/04* | (2006.01) |

(52) U.S. Cl. .................. 428/156; 428/40.1; 428/343; 428/167

(58) Field of Classification Search ............... 428/40.1, 428/41.8, 156, 167, 343, 42.1
See application file for complete search history.

(56) References Cited

U.S. PATENT DOCUMENTS

| | | | |
|---|---|---|---|
| 5,650,215 | A | 7/1997 | Mazurek et al. |
| 6,123,890 | A | 9/2000 | Mazurek et al. |
| 6,197,397 | B1 | 3/2001 | Sher et al. |
| 6,315,851 | B1 | 11/2001 | Mazurek et al. |
| 6,440,880 | B2 | 8/2002 | Mazurek et al. |
| 6,524,675 | B1 * | 2/2003 | Mikami et al. ............. 428/40.1 |

(Continued)

FOREIGN PATENT DOCUMENTS

EP    0725 809 B1    5/1995

(Continued)

OTHER PUBLICATIONS

English Translation of Mexican Office Action issued on the corresponding Mexican Patent Application No. PA/a/2005/007657, dated Aug. 13, 2009.

(Continued)

*Primary Examiner*—David R Sample
*Assistant Examiner*—Catherine Simone
(74) *Attorney, Agent, or Firm*—Knobbe Martens Olson & Bear LLP (57) ABSTRACT

A pressure-sensitive adhesive tape which comprises a resin film and a pressure-sensitive adhesive layer formed on at least one side of the film, and which has a concave-convex form containing plural grooves arranged at given intervals in a face of the pressure-sensitive adhesive layer that is to be stuck onto an adherend, and has a region where the interval of the arrangement of the grooves is 400 μm or more, the tensile modulus of the pressure-sensitive adhesive tape in the temperature range of 23 to 80° C. being in the range of 30 to 600 MPa. This tape has such an excellent workability that when the tape is stuck onto an adherend, air bubbles escape easily therefrom so as to prevent the generation of defects based on the entrainment of the air bubbles.

15 Claims, 1 Drawing Sheet

U.S. PATENT DOCUMENTS

| | | |
|---|---|---|
| 6,773,806 B1 | 8/2004 | Nakagawa et al. |
| 2002/0028312 A1* | 3/2002 | Onozawa et al. ............ 428/40.1 |
| 2003/0021930 A1* | 1/2003 | Mientus et al. ............ 428/40.1 |
| 2003/0178124 A1 | 9/2003 | Mikami et al. |
| 2005/0013958 A1* | 1/2005 | Callahan et al. ............ 428/40.1 |

FOREIGN PATENT DOCUMENTS

| | | |
|---|---|---|
| JP | 4-239082 | 8/1992 |
| JP | 5-098219 | 4/1993 |
| JP | 6-220412 | 8/1994 |
| JP | 7-126582 | 5/1995 |
| JP | 2503717 | 4/1996 |
| JP | 9-241442 | 9/1997 |
| JP | 63-223081 | 9/1998 |
| JP | 2587198 | 10/1998 |
| JP | 11-209704 | 8/1999 |
| JP | 2001-192629 | 7/2001 |
| JP | 2002-241719 A | 8/2002 |
| JP | 2002-544364 A | 12/2002 |
| JP | 2003-145660 A | 5/2003 |
| JP | 2003-342533 A | 12/2003 |
| JP | 2004-149811 A | 5/2004 |
| JP | 2004-269901 A | 9/2004 |
| MX | PA01011500 A | 7/2002 |
| WO | WO 99/35201 | 7/1999 |
| WO | WO 00/69985 | 11/2000 |
| WO | WO 02/13980 A1 | 2/2002 |
| WO | WO 02/14447 A1 | 2/2002 |
| WO | WO 03/099953 A1 | 12/2003 |

OTHER PUBLICATIONS

Office Action issued in the corresponding Japanese Patent Application No. 2004-211775, dated Apr. 13, 2010.

* cited by examiner

Convex region width (a): 30-70 μm
Convex region height (b): 15-25 μm
Concave region width (c): 400-600 μm

FIG. 2

PRESSURE-SENSITIVE ADHESIVE TAPE

BACKGROUND OF THE INVENTION

1. Field of the Invention

The present invention relates to a pressure-sensitive adhesive tape. More specifically, the invention relates to a pressure-sensitive adhesive tape having an excellent bubble-escaping property without using any PVC (polyvinyl chloride) film. The pressure-sensitive adhesive tape of the invention is in particular useful as a painting-alternate member excellent in design property which is desired particularly in the automobile industry and the house building material industry or as a tape or film for decoration or labeling.

2. Description of the Related Art

In general, surface-protecting pressure-sensitive adhesive tapes, pressure-sensitive adhesive tapes for decoration, and painting-alternate tapes for automobiles or houses are desired to have a relatively large sticking-area and a designed external appearance. For this reason, main currents in recent years are pressure-sensitive adhesive tapes wherein their peeling sheet (separator) is subjected to unevenness-forming working so as to have a continuous-groove structure and then this worked face is transcribed to a pressure-sensitive adhesive layer. Such pressure-sensitive adhesive tapes make it possible to cause fluids such as air and liquid to go off (or escape) through their distribution channels by the groove structure of their pressure-sensitive adhesive layer face. Thus, bubbles of the air or pools of the liquid are not easily generated.

As means in connection with the above, for example, the following have been suggested hitherto: a pressure-sensitive adhesive work sheet having a pressure-sensitive adhesive layer wherein a large number of independent small convex regions are arranged in the form of scattered points (see, for example, Registered Japanese Utility Models No. 2503717 and No. 2587198); an easily-sticking pressure-sensitive adhesive sheet having, in its pressure-sensitive adhesive layer face, distribution channels for air (see, for example, Japanese Patent Application Laid-Open (JP-A-) No. 63-223081); a pressure-sensitive adhesive sheet having a pressure-sensitive adhesive layer wherein grooves are made between convex regions and adjacent convex regions (see, for example, JP-A No. 11-209704); an article with a pressure-sensitive adhesive which has a pressure-sensitive adhesive layer having a surface with fine structures of a small pitch size (see, for example, JP-A No. 2002-544364); a pressure-sensitive adhesive sheet the plastic deformation of which is controlled by the storage elastic modulus of an adhesive (see, for example, JP-A No. 2003-342533); and so on.

However, in almost all of practicable embodiments of these pressure-sensitive adhesive tapes, a PVC (polyvinyl chloride) film is used, and an adherend to which the film is stuck is exposed to a high temperature of 40 to 80° C. in particular immediately after the sticking, or is subjected to various kinds of heat hysteresis by the use thereof outdoors over a long term in many cases. Since the PVC film is excellent in workability, heat resistance, flexibility, solvent resistance, the film is widely used in members for building, automobiles, and housing. However, the PVC film depends largely on environment temperature; therefore, when this film is thin (100 µm), the film cannot keep the elasticity thereof in the step wherein the film is subjected to the heat hysteresis (for example, in an environment of 50° C. or higher temperature) so as to result in a drawback that the film is plastically deformed. It has been therefore become evident that when a groove structure remains in the above-mentioned pressure-sensitive adhesive layer or air bubbles are somewhat present between the grooves and an adherend and in this case the layer is subjected to heat hysteresis, the following problems are caused: the PVC film is plasticized so that the groove structure makes its appearance on the surface of the film; the film, the stress of which is not being kept, which results from expansion of the volume with a rise in the temperature of the remaining air bubbles, gets longer so that the external appearance thereof is damaged; and other problems. Additionally, many makers tend to restrict or abolish the use of PVC since PVC generates dioxins when PVC is incompletely burned at low temperature.

Furthermore, for example, about the article with the pressure-sensitive adhesive (see, for example, the JP-A No. 2002-544364), which has a pressure-sensitive adhesive layer having a surface with fine structures of a small pitch size, precise working is necessary when the article is produced. Thus, problems are caused from the viewpoint of the maintenance of the stability of such articles or costs. About the pressure-sensitive adhesive sheet the elastic deformation of which is controlled by the storage elastic modulus of the adhesive therein (see, for example, JP-A No. 2003-342533), the performance of the adhesive may not be appropriately obtained in accordance with the kind of an adherend to be used in some cases.

SUMMARY OF THE INVENTION

Thus, in order to solve the above-mentioned problems, an object of the present invention is to provide a pressure-sensitive adhesive tape which has such an excellent workability that when the tape is stuck onto an adherend, air bubbles escape easily therefrom so as to prevent the generation of defects based on the entrainment of the air bubbles. Another object thereof is to provide a pressure-sensitive adhesive tape the appearance of which is not damaged after the tape is stuck onto an adherend even if the uneven form (i.e., concave-convex form) of its pressure-sensitive adhesive layer has regions having an elevation difference of 400 µm or more. Still another object thereof is to provide a pressure-sensitive adhesive tape good in external appearance wherein a groove pattern as described above does not make its appearance even if the tape is exposed to a high temperature of 40 to 80° C.

In order to attain the above-mentioned objects, the inventors have made eager investigation mainly on physical properties of pressure-sensitive adhesive tapes so as to find out that a pressure-sensitive adhesive tape which comprises a pressure-sensitive adhesive layer whose face to be stuck onto an adherend has a given concave region width and which has a tensile modulus of 30 to 600 MPa at a temperature range of 23 to 80° C. is a pressure-sensitive adhesive tape having an excellent bubble-escaping property and having a good external appearance even after the tape is subjected to high-temperature treatment. As a result, the present invention has been made.

Accordingly, the pressure-sensitive adhesive tape of the present invention is a pressure-sensitive adhesive tape which comprises a resin film and a pressure-sensitive adhesive layer formed on at least one side of the film; and which has a concave-convex form containing plural grooves arranged at given intervals in a face of the pressure-sensitive adhesive layer that is to be stuck onto an adherend, and has a region where the interval of the arrangement of the grooves is 400 µm or more, the tensile modulus of the pressure-sensitive adhesive tape in the temperature range of 23 to 80° C. being in the range of 30 to 600 MPa.

The tensile modulus in the present invention is a value (MPa) calculated in accordance with JIS K7133.

According to the present invention, the above-mentioned pressure-sensitive adhesive tape, which has the given concave-convex form in the face of the pressure-sensitive adhesive layer that is to be stuck onto an adherend, and further which has a tensile modulus of 30 to 600 MPa in the temperature range of 23 to 80° C. and has an excellent bubble-escaping property and a good external appearance even after the tape is subjected to high-temperature treatment, as shown as results of working examples. Details of the reason why the above-mentioned pressure-sensitive adhesive tape exhibits such properties are unclear, and the reason can be presumed as follows: by means of the concave-convex form, which contains the grooves arranged at the given intervals in the face of the pressure-sensitive adhesive layer that is to be stuck onto an adherend, bubbles generated between the adherend and the pressure-sensitive adhesive layer, in the state that they adhere to each other, can easily be pushed outside; and even after the tape is subjected to high-temperature treatment or the like, the resin film can be restrained from undergoing deformation (that is, the generation of external appearance defects, such as the appearance of the groove structure, and swelling) since the resin film has a specific remaining elasticity.

It is preferred about the above-mentioned pressure-sensitive adhesive tape that at the time of plotting the temperature thereof and the tensile modulus thereof along the transverse axis and the vertical axis of a graph, respectively, the index-converted gradient K of the tensile modulus of this tape with a rise in the temperature is −0.05 or more, the gradient K being calculated from the following equation:

$$y = \alpha \times e^{Kx} \quad (1)$$

wherein y represents the tensile modulus (MPa), x represents the temperature (° C.), α represents the index-converted intercept value (MPa), and K represents the index-converted gradient (−). The pressure-sensitive adhesive tape wherein the index-converted gradient K is −0.05 or more is a pressure-sensitive adhesive tape which makes it possible to restrain effectively plastic deformation of the resin film based on heat and external appearance defects based on the transcription of the uneven pattern of the pressure-sensitive adhesive layer.

It is preferred about the pressure-sensitive adhesive tape that the resin film has, on at least one side thereof, a thermosetting acryl-based hard coating layer having a thickness of 1 to 20 μm. When the hard coating layer is further fitted to the pressure-sensitive adhesive tape of the invention, the tape becomes a pressure-sensitive adhesive tape wherein the following are more effectively restrained than when only the hard coating layer is fitted to a pressure-sensitive adhesive tape: plastic deformation of the resin film based on heat; and external appearance defects based on the transcription of the uneven pattern of the pressure-sensitive adhesive layer.

It is preferred about the pressure-sensitive adhesive tape of the invention that the concave region depth of the grooves in the pressure-sensitive adhesive layer is from 15 to 25 μm, the convex region width thereof is from 400 to 600 μm, and the concave region width thereof is from 30 to 70 μm. The pressure-sensitive adhesive tape having this pressure-sensitive adhesive layer is a pressure-sensitive adhesive tape having an excellent bubble-escaping property and a good external appearance even after the tape is subjected to high-temperature treatment since the tape has a thermal property producing effects and advantages as described above.

The separator-attached pressure-sensitive adhesive tape of the present invention is a tape wherein the height of convex regions in a surface of a separator present at the side of its pressure-sensitive adhesive layer is from 15 to 25 μm, and the width of concave regions therein is from 400 to 600 μm, and the width of the convex regions is from 30 to 70 μm. The pressure-sensitive adhesive tape having this pressure-sensitive adhesive layer is a separator-attached pressure-sensitive adhesive tape having an excellent bubble-escaping property and a good external appearance even after the tape is subjected to high-temperature treatment since this tape is formed by crosslinking the pressure-sensitive adhesive composition which produces effects and advantages as described above.

BRIEF DESCRIPTION OF THE DRAWINGS

FIG. 2 is a graph obtained by plotting temperatures and tensile modulus values of evaluating samples of working examples and so on.

BEST MODES FOR CARRYING OUT THE INVENTION

Embodiments of the present invention will be described in detail hereinafter.

The pressure-sensitive adhesive tape of the present invention is a pressure-sensitive adhesive tape which comprises a resin film and a pressure-sensitive adhesive layer formed on at least one side of the film, and which has a concave-convex form containing plural grooves arranged at given intervals in a face of the pressure-sensitive adhesive layer that is to be stuck onto an adherend, and has a region where the interval of the arrangement of the grooves is 400 μm or more, the tensile modulus of the pressure-sensitive adhesive tape in the temperature range of 23 to 80° C. being in the range of 30 to 600 MPa.

Since the present invention has a significance as an alternate article for a soft PVC (polyvinyl chloride) film, the resin film used in the invention is a film made of a resin having flexibility other than PVC.

The resin film used in the invention is, in particular, a film obtained by incorporating, into a thermoplastic resin, a resin non-affinitive therewith and then melt-extruding the resultant mixture. Particularly preferable is a resin film having a layer comprising a flexible polyolefin resin.

The thermoplastic resin may be, for example, a polyolefin resin such as polypropylene, polyethylene, or a TPO resin (olefin-based thermoplastic elastomer). These resins may be used alone, or two or more of them may be used by mixing.

Specific examples of the resin component which constitutes the resin film include various polyethylenes from low density polyethylene to high density polyethylene, isotacitic polypropylene, atactic polypropylene, syndiotactic polypropylene, polyester resin, polyamide resin, polycarbonate resin, and (meth)acryl-based polymer. These resin components may be used alone, or two or more of them may be used by mixing.

In the invention, (meth)acryl-based polymer means acryl-based polymer and/or methacryl-based polymer, and (meth)acrylate means acrylate and/or methacrylate.

It is allowable to add, to the resin film, for example, an ultraviolet absorbent or a heat-resistant stabilizer, such as a benzotriazole-based compound, a benzophenone-based compound, a benzoate-based compound or a cyanoacrylate-based compound, at will. These compounds may be used alone, or two or more of them may be used by mixing.

The thickness of the resin film of the invention may be appropriately set in accordance with the use purpose thereof, and is preferably from 60 to 200 μm, more preferably from 75 to 150 μm.

In the pressure-sensitive adhesive tape of the invention, the tensile modulus in the temperature range of 23 to 80° C. is in the range of 30 to 600 MPa. More preferably, the tensile modulus at 23° C. is from 300 to 600 MPa, and even more preferably it is from 400 to 500 MPa. If the tensile modulus at 23° C. is more than 600 MPa, at the time of sticking the pressure-sensitive adhesive tape onto a curved adherend at room temperature the tape may be peeled by the generation of repulsive force. On the other hand, if it is less than 300 MPa, the resin film may lengthen when the pressure-sensitive adhesive tape is stuck onto an adherend under the application of tension thereto. Both the cases are not preferred since defects may be caused.

In the case that the pressure-sensitive adhesive tape of the invention is stuck onto an adherend at room temperature and next the resultant is put into an environment of a high temperature of 60° C., the tensile modulus at 60° C. is preferably from 50 to 400 MPa, more preferably from 80 to 350 MPa. If the tensile modulus at 60° C. becomes smaller than 50 MPa, inflation is generated between the tape and the adherend or the groove structure is transcribed to the resin film in accordance with the mesh size of the uneven structure of the pressure-sensitive adhesive layer, so as to damage the external appearance unfavorably.

When the pressure-sensitive adhesive tape is put into an environment of a high temperature of 80° C. for a long time, the tensile modulus at 80° C. is preferably from 30 to 250 MPa, more preferably from 50 to 200 MPa.

In the pressure-sensitive adhesive tape of the invention, at the time of plotting the temperature thereof and the tensile modulus thereof along the transverse axis and the vertical axis of a graph, respectively, the index-converted gradient K of the tensile modulus of the pressure-sensitive adhesive tape with a rise in the temperature is preferably −0.05 or more and is more preferably from −0.03 to −0.02. The gradient K is calculated from the following equation:

$$y = a \times e^{Kx} \tag{1}$$

wherein y represents the tensile modulus (MPa), x represents the temperature (° C.), α represents the index-converted intercept value (MPa), and K represents the index-converted gradient (−). If the index-converted gradient K is smaller than −0.05, the temperature dependency of the resin film is large so that the resin film is plastically deformed by heat with ease. Consequently, the uneven pattern of the pressure-sensitive adhesive layer is transcribed to the resin film, or the elasticity of the film does not resist against stress based on the volume expansion of remaining bubbles by heat so that the tape may swell. As a result, the external appearance may be damaged.

In the invention, a thermosetting acryl-based hard coating layer can be formed on at least one side of the resin film. The formation of the hard coating layer makes it possible to improve the weather resistance, the light resistance, and the solvent resistance.

It is particularly preferred to use, in the hard coating layer, a HALS hybrid polymer wherein a polymer having an acryl-based skeleton is copolymerized with a functional group having a hindered amine light stabilizer (HALS).

The HALS hybrid polymer having an acryl-based skeleton is an acryl-based polymer obtained by copolymerizing a (meth)acrylate skeleton with a hindered amine light stabilizer (HALS) having at a terminal thereof a functional group. Examples of the (meth)acrylate include alkyl (meth)acrylates wherein examples of the alkyl group include methyl, ethyl, n-propyl, isopropyl, n-butyl, 2-ethylhexyl, lauryl, stearyl, and cyclohexyl groups; and monomers having a crosslinking functional group, such as monomers having a hydroxyl, carboxyl, methylol, acid anhydride, amino, or epoxy group. These compounds may be used alone, or two or more of them may be used by mixing.

As the HALS, a known HALS can be used without any especial limitation. Specific examples thereof include reactive type compounds such as Adekastab (transliteration) LA-82 and LA-87 manufactured by Asahi Denka Kogyo K.K., monomer type compounds such as Hostabin (transliteration) N-20 manufactured by Hoechst Japan Co., Tomisoap (transliteration) 77 manufactured by Yoshitomi Fine Chemical Ltd., and oligomer type compounds such as Uvinal 5050H manufactured by BASF Japan Co. These compounds may be used alone, or two or more of them may be used by mixing.

The hard coating layer in the invention is a layer using a high-density crosslinked type agent the hydroxyl value (vanish value=the amount of cross-link points) of which is from 20 to 80, preferably from 30 to 70, more preferably from 40 to 60 out of hard coating agents of HALS hybrid polymers having an acryl-based skeleton having weather resistance and light-resistant stability. If the hydroxyl value (vanish value) is less than 20, the solvent resistance lowers remarkably. If the value is more than 80, there is generated a tendency that the solvent resistance is excellent but the flexibility is poor.

The hard coating layer in the invention is generally deposited, as a polymer solution, on the resin film. The thickness thereof is usually from 1 to 20 μm, preferably from 1.5 to 8 μm, more preferably from 2 to 5 μm. When the thickness is set into this range, the pressure-sensitive adhesive tape effectively exhibits solvent resistance and can simultaneously keep flexibility. If the thickness is less than 1 μm, the solvent resistance is poor. If it is more than 20 μm, the flexibility may become poor.

Examples of the solvent used in the above-mentioned polymer solution include aromatic hydrocarbon solvents such as toluene and xylene; aliphatic carboxylic acid ester solvents such as ethyl acetate and butyl acetate; aliphatic hydrocarbon solvents such as hexane, heptane, and octane; and ketone solvents such as acetone, methyl ethyl ketone, and methyl isobutyl ketone. These solvents may be used alone, or two or more of them may be used by mixing.

The content by percentage of the solvent in the polymer solution is usually from about 10 to 70% by weight.

Besides the above-mentioned components, the following can be appropriately used as optional components in the polymer solution: various thickeners such as phenol resin, terpene-phenol resin, terpene resin, xylene resin, rosin, and hydrogenated rosin, inorganic fillers such as calcium carbonate and carbon black, a lubricant, an age resistor, a dye, a colorant, a pigment, a surfactant, a plasticizer, an antifoaming agent, a flame retardant, a light stabilizer, a thixotropy agent, an ultraviolet absorbent, a low-molecular-weight polymer, a surface-lubricating agent, a leveling agent, an antioxidant, a polymerization inhibitor, a heat-resistant stabilizer, a hydrolysis-resistant stabilizer, a metal powder, and a granule-form, or foil-form substance. These optional components may be used alone, or two or more of them may be used by mixing.

The method for applying the polymer solution is not especially limited, and may be appropriately selected from known ordinarily-used methods. For example, the polymer solution can be applied onto the resin film, using a coater, such as a bar coater, a spin coater, a roll coater, or applicator, appropriately.

The pressure-sensitive adhesive tape of the invention is a tape obtained by the formation of a pressure-sensitive adhesive layer by applying a pressure-sensitive adhesive onto the resin film (in the case that hard coating layers are formed on both surfaces of the resin film, the adhesive is applied onto one of the hard coating layers).

The method for applying the pressure-sensitive adhesive is not especially limited, and may be appropriately selected from ordinarily-used methods. For example, the above-mentioned coater is used to apply a solution of the pressure-sensitive adhesive onto the resin film (or a separator thereon), and then the solvent is removed therefrom, whereby a pressure-sensitive adhesive layer can be formed. A crosslinking agent is added to the solution of the pressure-sensitive adhesive, and then the resultant is heated and crosslinked to set the pressure-sensitive adhesive polymer therein, whereby a pressure-sensitive adhesive layer can be formed.

As the pressure-sensitive adhesive, known one can be used without any especial limitation. For example, various pressure-sensitive adhesives such as rubber-based, acryl-based, and silicone-based pressure-sensitive adhesives can be used. These adhesives may be used alone, or two or more of them may be used by mixing.

The crosslinking agent used in the invention may be an isocyanate compound, an epoxy compound, a melamine-based resin, an aziridine derivative, a metal chelate compound, or the like. Particularly preferable is an isocyanate or epoxy compound since the compound gives an appropriate cohesive strength. It is particularly preferable that at the time of the production of a polymer, the polymer is copolymerized with a hydroxyl-containing monomer such as 2-hydroxyethyl acrylate so as to introduce the hydroxyl group into the polymer and then a polyisocyanate compound is used as a crosslinking agent for this polymer. These compounds may be used alone, or two or more of them may be used by mixing.

Examples of the isocyanate compound include low aliphatic polyisocyanates such as butylene diisocyanate and hexamethylene diisocyanate; alicyclic isocyanates such as cyclopentylene diisocyanate, cyclohexylene diisocyanate, and isophrone diisocyanate; aromatic isocyanates such as 2,4-tolylene diisocyanate, 4,4'-diphenylmethane diisocyanate, and xylylene diisocyanate; isocyanate adducts such as a trimethylolpropane/tolylene diisocyanate trimer adduct (trade name: Coronate L, manufactured by Nippon Polyurethane Industry Co., Ltd.), a trimethylolpropane/hexamethylene diisocyanate trimer adduct (trade name: Coronate HL, manufactured by Nippon Polyurethane Industry Co., Ltd.), and an isocyanurate product of hexamethylene diisocyanate (trade name: Coronate HX, manufactured by Nippon Polyurethane Industry Co., Ltd.); and diisocyanate adducts to polyol. These compounds may be used alone, or two or more of them may be used by mixing.

Examples of the epoxy include N,N,N',N'-tetraglycidyl-m-xylenediamine (trade name: TETRAD-X, manufactured by Mitsubishi Gas Chemical Co., Inc.), and 1,3-bis(N,N-diglycidylaminomethyl)cyclohexane (trade name: TETRAD-C, manufactured by Mitsubishi Gas Chemical Co., Inc.). These compounds may be used alone, or two or more of them may be used by mixing.

An example of the melamine-based resin is hexamethylolmelamine.

Examples of the aziridine derivative include commercially available products manufactured by Sogo Pharmaceutical Co., Ltd. (trade names: HDU, TAZM and TAZO). These compounds may be used alone, or two or more of them may be used by mixing.

Examples of the metal chelate compound include compounds wherein the metal component thereof is aluminum, iron, tin, titanium, or nickel, and the chelate component thereof is acetylene, methyl acetoacetate, or ethyl lactate. These compounds may be used alone, or two or more of them may be used by mixing.

The content of the crosslinking agent used in the invention is usually from about 0.01 to 5 parts by weight for 100 parts by weight of the base polymer such as (meth)acrylate-based polymer.

The solvent which may be optionally used for the application of the pressure-sensitive adhesive can be selected from known ones without any especial limitation. Examples thereof include aromatic hydrocarbon solvents such as toluene, xylene, and mesitylene; aliphatic carboxylic acid esters such as ethyl acetate, and butyl acetate; aliphatic hydrocarbon solvents such as hexane, heptane, and octane; and ketone solvents such as acetone, methyl ethyl ketone, and methyl isobutyl ketone. These solvents may be used alone, or two or more of them may be used by mixing.

Besides the above-mentioned components, the following can be appropriately used as optional components in the pressure-sensitive adhesive: various thickeners such as phenol resin, terpene-phenol resin, terpene resin, xylene resin, rosin and hydrogenated rosin, inorganic fillers such as calcium carbonate and carbon black, a lubricant, an age resistor, a dye, a colorant, a pigment, a surfactant, a plasticizer, an antifoaming agent, a flame retardant, a light stabilizer, a thixotropy agent, an ultraviolet absorbent, a low-molecular-weight polymer, a surface-lubricating agent, a leveling agent, an antioxidant, a polymerization inhibitor, a heat-resistant stabilizer, hydrolysis-resistant stabilizer, a metal powder, and a granule- or foil-form substances. These optional components may be used alone, or two or more of them may be used by mixing.

The thickness of the pressure-sensitive adhesive layer used in the invention is preferably from about 1 to 300 µm, more preferably from 10 to 75 µm after the adhesive layer is dried. If the thickness is less than 1 µm, the adhesive strength to an adherend is insufficient. If the thickness is more than 300 µm, the adhesive strength is saturated so that economical efficiency is lost. Moreover, the adhesive is pushed out, or cohesion breakdown is caused so that the tape is not easily peeled.

The method for forming the pressure-sensitive adhesive layer on the film is not especially limited. The layer is formed by, for example, a method of applying the pressure-sensitive adhesive onto the separator (or the resin film), and drying and removing the polymerization solvent and others therein to form the pressure-sensitive adhesive layer on the separator (or the resin film), or a method of applying the pressure-sensitive adhesive onto another substrate, drying and removing the polymerization solvent and others therein, and then transferring/forming the pressure-sensitive adhesive layer onto the separator (or the resin film). After the formation of the pressure-sensitive adhesive layer, the layer may be cured for the adjustment of the shift of the components in the pressure-sensitive adhesive layer, the adjustment of the crosslinking reaction, and others. When the pressure-sensitive adhesive is applied onto the separator (or the resin film) to form a pressure-sensitive adhesive sheet, one or more solvents other than the polymerization solvent may be newly added to the composition so that the adhesive can be evenly applied onto the separator (or the resin film).

The method for forming the pressure-sensitive adhesive layer may be appropriately selected from known methods used to produce a pressure-sensitive adhesive sheet. Specific examples thereof include roll coating, kiss roll coating, gravure coating, reverse coating, roll brush coating, spray coating, dip roll coating, bar coating, knife coating, and air knife coating.

If necessary, the separator (or the resin film) may be subjected to, for example, releasing or antifouling treatment with a silicone type, fluorine-containing type, long chain alkyl type or aliphatic acid amide type releasing agent, or silica powder, an adhesion-promoting treatment such as acid treatment, alkali treatment, primer treatment, anchor coat treatment, corona treatment, plasma treatment or ultraviolet treatment, or an antistatic treatment such as coating type, kneading type or vapor-deposition type treatment.

The pressure-sensitive adhesive tape of the invention is, for example, a tape comprising a separator having a peeling face in a concave-convex form (i.e., an uneven form) and a pressure-sensitive adhesive wherein the adhesive is laminated on the concave-convex face of the separator and the concave-convex form is transcribed on the adhesive layer to make a groove structure. The separator in the concave-convex form can be produced by working the raw material of the separator into a desired uneven form by a known method. The concave-convex form made in the separator is not especially limited if the form is a form capable of transcribing a continuous-groove structure to the pressure-sensitive adhesive layer. This form is, for example, a form having a structure wherein continuous lattices are formed, as in a separator illustrated in FIGS. 1A and 1B (convex region width: (a), convex region height: (b), and concave region width: (c)).

Figure 1A:
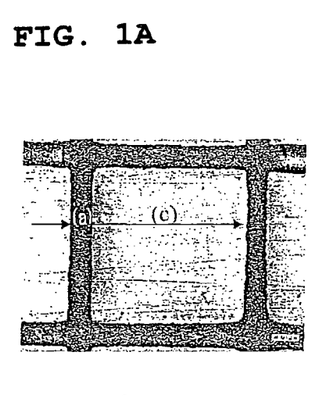
FIGS. 1A and 1B are each a main part sectional view illustrating an example of a concave-convex form of a separator surface for forming concave-convex grooves.
Figure 1B:
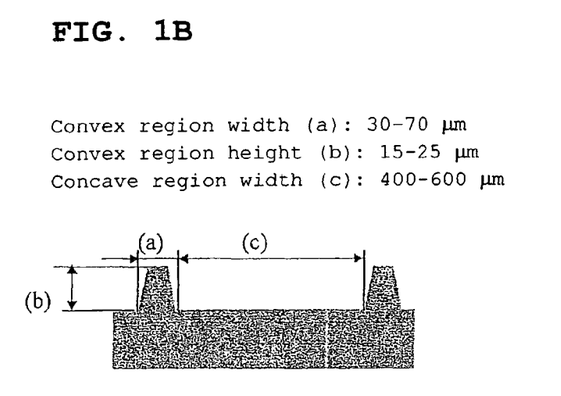
Figure 2:
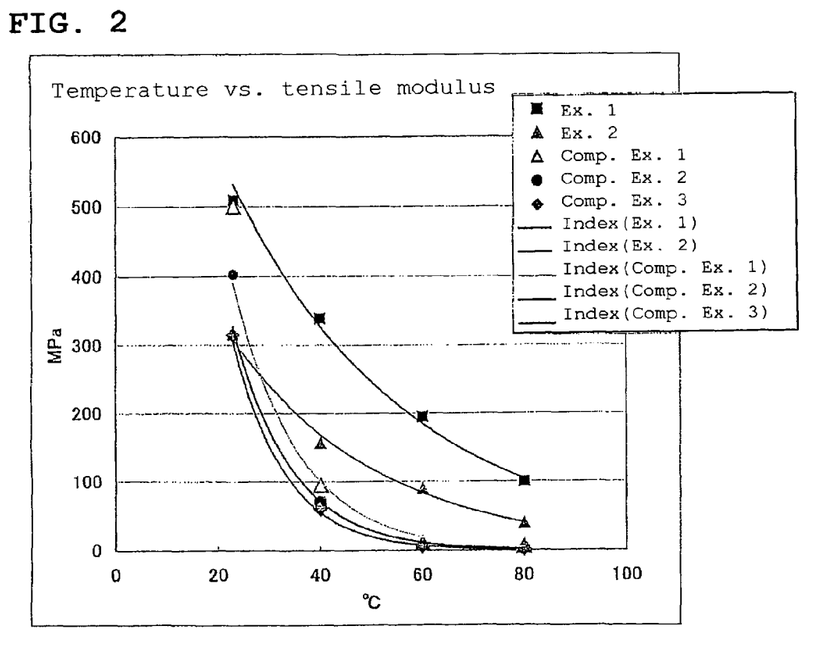

In the pressure-sensitive adhesive tape of the invention, it is particularly effective to use a separator having a concave region width (c) of 400 μm or more and a concave region width (a)+(c) of 450 μm or more. The concave region width (c) is preferably from 400 to 700 μm, more preferably from 450 to 550 μm. It is preferred that the convex region height (b) of the separator surface at the side of the pressure-sensitive adhesive layer is from 15 to 25 μm, the concave region width (c) thereof is from 400 to 600 μm, and the convex region width (a) thereof is from 30 to 70 μm.

The separator-attached, pressure-sensitive adhesive tape of the invention is a tape wherein a separator is stuck on the above-mentioned pressure-sensitive adhesive layer. This separator is appropriately removed when the surface of the pressure-sensitive adhesive layer is used.

The separator used in the invention can be appropriately selected, without any especial limitation, from members which have been hitherto used as a separator. Specific examples of the separator (peeling sheet) include plastic films such as polyethylene, polypropylene, polyethylene terephthalate, and polyester films; paper products such as glassine paper, coated paper, and laminated paper products; porous material sheets such as clothes and nonwoven fabric sheets; and various thin bodies, such as a net, a foamed sheet, a metal foil, and laminates thereof. Any one of the plastic films is preferably used since it is excellent in surface flatness or smoothness. The film is not limited to any especial kind if the film can protect the pressure-sensitive adhesive layer. Examples thereof include polyethylene, polypropylene, polybutene, polybutadiene, polymethylpentene, polyvinyl chloride, vinyl chloride copolymer, polyethylene terephthalate, polybutylene terephthalate, polyurethane, and ethylene-vinyl acetate films.

The concave-convex form of the separator can be transcribed onto the pressure-sensitive adhesive layer by laminating the separator onto the pressure-sensitive adhesive layer or sticking the concave-convex form surface of the separator onto the pressure-sensitive adhesive layer. It is preferred that the concave region depth (b) of the grooves in the pressure-sensitive adhesive layer is from 15 to 25 μm, the convex region width (c) thereof is from 400 to 600 μm and the concave region width (a) thereof is from 30 to 70 μm.

Examples of the process for producing the pressure-sensitive adhesive tape of the invention include a method of using a separator having a concave-convex form peeling-surface to form a pressure-sensitive adhesive layer on this concave-convex form surface, and next sticking this pressure-sensitive adhesive layer onto a resin film; and a method of forming a pressure-sensitive adhesive layer on a resin film, and next sticking a separator having a concave-convex form onto the pressure-sensitive adhesive layer. The concave-convex form made in the surface of the separator is transcribed to the pressure-sensitive adhesive layer by any one of these methods.

The pressure-sensitive adhesive tape of the invention is more remarkably good in the maintenance of production stability, costs, and others than suggestions in the prior art (for example, the above-mentioned JP-A Nos. 2002-544364 and 2003-342533) since the tape of the invention can be used without depending the concave region width thereof and the composition of the pressure-sensitive adhesive therein, as described above.

Since the pressure-sensitive adhesive tape and the separator-attached, pressure-sensitive adhesive tape of the invention have the above-mentioned structure, they are excellent in bubble-escaping property and are also good in external appearance even after high-temperature treatment thereof. They are therefore useful as paint-alternate members having an excellent design, which are particularly desired in the automobile industry and the house building material industry, or as tapes or films for decoration or labeling.

EXAMPLES

The following will describe working examples and so on which specifically demonstrate the structural requirements of the invention and advantageous effects thereof, but the invention is not limited thereto. Items evaluated in the examples and so on were measured as follows.

<Measurement of Tensile Modulus>

About each produced pressure-sensitive adhesive tape with a separator, the tensile modulus of the tape from which the separator was removed was measured according to JIS K7113. The measurement was made using a No. 1 model test piece under the following conditions: a distance between marked lines of 50±0.5 mm; a test piece width of 10±0.5 mm; and a measuring test speed of 200 mm/min. The measurements when the temperature was raised to 40, 60 and 80° C., respectively, were made in the state that the test piece was allowed to stand still at the environment temperatures, respectively, for 30 minutes without changing the temperature.

<Method of Calculating Index-Converted Gradient K of Tensile Modulus>

About each produced pressure-sensitive adhesive tape with a separator, the index-converted gradient K of the tensile modulus of the tape from which the separator was removed was calculated the following equation:

$$y = \alpha \times e^{Kx} \quad (1)$$

wherein y represents the tensile modulus (MPa), x represents the temperature (° C.), α represents the index-converted intercept value (MPa), and K represents the index-converted gradient (−). In other words, the resultant tensile modulus was plotted as y along the vertical axis (y axis) of a graph and the measured temperature was plotted as x along the transverse axis (x axis) thereof, thereby carrying out index conversion to calculate the gradient K from the equation (1).

More specifically, the index conversion can be carried out by giving tensile modulus (y) and measurement temperature (x) as the vertical axis and the transverse axis of a graph, respectively, plotting three or more values thereof obtained by actual measurement (measured temperature: x, and measured tensile modulus: y), and then calculating an exponential function (by use of, for example, a spreadsheet program "EXCEL" manufactured by Microsoft Corp.). The correlation function $R^2$ of the equation used at the time of obtaining the exponential function needs to be 0.9 or more.

The α value and the K value can be obtained as follows: the logarithm of tensile modulus ($\log_e$ "tensile modulus"=$\log_e y$) is indicated by the vertical axis of a graph, measured temperature is indicated by the transverse axis thereof, and further three or more actually-measured values (measured temperature: x, and logarithm of the tensile modulus: $\log_e y$) are plotted in the graph; and the α value and the K value can be obtained from the vertical axis intercept of a linear line obtained at this time and the gradient of the linear line, respectively. It is necessary that the correlation function $R^2$ of the equation used at the time of obtaining the linear line is 0.9 or more. It is also preferred to use a tape having an α value of 300 MPa or more.

<Evaluation of Bubble-Escaping Property>

Each produced pressure-sensitive adhesive tape with a separator was cut into a piece, 5 cm×5 cm, and the pressure-sensitive adhesive face revealed by peeling the separator was pressed/stuck onto a melamine-painted iron plate (7 cm lengthwise and 15 cm wide), and the resultant piece was used as a sample for evaluating bubble-escaping property (conditions for the pressing/sticking: the sample was stuck onto the plate while the periphery thereof was pushed and traced with the finger, so as to make a dead air space inside the center thereof). This evaluating sample was rubbed with a squeeze to push the air space, and then the state that the air escaped from the sample was observed with the naked eye. The criterion for the evaluation is as follows:

○: The air was lost.

x: The air remained.

<Evaluation of Surface Roughness>

Each produced pressure-sensitive adhesive tape with a separator was cut into a piece, 5 cm×5 cm, and the pressure-sensitive adhesive face revealed by peeling the separator was pressed/stuck onto a melamine-painted iron plate (7 cm lengthwise and 15 cm wide), and the resultant piece was used as a sample for evaluating surface roughness (conditions for the pressing/sticking: a roll was caused to reciprocate one time on the sample at a roll pressure of 0.3 MPa and a rate of 2 m/min.). The evaluating sample was cured at room temperature (about 23° C.) for 5 minutes, and then subjected to heat treatment in an oven of 80° C. temperatures for 24 hours. Thereafter, this evaluating sample was allowed to stand still at room temperature (about 23° C.) for 24 hours. The following were observed with the naked eye: the degree of the transcription of the groove structure to the surface of the evaluating sample, and the matter as to whether or not the sample swelled. The criterion for the evaluation is as follows:

○: no uneven groove structure came to the front, and further the sample did not swell.

x: An uneven groove structure came to the front, or the sample swelled.

Example 1

A homo-polypropylene resin (homo-pp) (trade name: FY4, manufactured by Japan Polychem Corp.), a linear low-density polyethylene (LDPE) (trade name: Sumikasen (transliteration) G-401, manufactured by Sumitomo Chemical Co., Ltd.) and a reactor (polymerizable) thermoplastic olefin-based elastomer (r-TPO) (trade name: X500F, manufactured by Sun Allomer Ltd.) were charged at a ratio by weight of the homo-pp/the LDPE/the r-TPO of 60/20/20 into an extruder (trade name: GM 30-28 extruder, manufactured by G M Engineering Co.), and then the mixture was molded through a T die into the form of a melt-extruded sheet (thickness: 100 μm). In this way, a sheet-form molded product was obtained.

Next, 100 parts by weight of a HALS-copolymerized HALS hybrid polymer (trade name: HALS Hybrid UV-G300, manufactured by Nippon Shokubai Co., Ltd., hydroxyl value (vanish value): 39±8), 13 parts by weight of a hardener (trade name: Sumijule (transliteration) N-3200, manufactured by Sumitomo Bayer Urethane Co., Ltd.), and a diluting solvent (ethyl acetate) were mixed so that the content by percentage of non-volatile components therein would be 20%. Next, a bar coater was used to apply the mixture, as a hard coating layer material, onto the sheet-form molded product so as to have a thickness of 2 μm after the drying of the mixture. Thereafter, the resultant was dried at 120° C. for 2 minutes, and then subjected to hardening acceleration aging (at 60° C. for 2 days) to yield a resin film.

Next, formed was a separator having a surface subjected to unevenness-forming working ((a): 50 μm, (b): 15 μm, and (c): 450 μm). An applicator was used to coat this concave-convex face with a pressure-sensitive adhesive polymer solution, wherein an acryl-based pressure-sensitive adhesive (2-ethylhexyl acrylate-based pressure-sensitive adhesive, manufactured by Nitto Denko Corp.) and a crosslinking agent (trade name: Coronate L, manufactured by Nippon Polyurethane Industry Co., Ltd.) were mixed (at a ratio of the adhesive to the crosslinking agent of 100/3) so as to set the content by percentage of non-volatile components therein to 20% by weight, in such a manner that the pressure-sensitive adhesive after being dried would have a thickness of 30 μm. Thereafter, the resultant was dried at 100° C. for 2 minutes to form a pressure-sensitive adhesive layer, thereby producing a separator with the pressure-sensitive adhesive layer. The above-mentioned resin film was laminated onto this separator with the pressure-sensitive adhesive layer by means of a laminator, so as not to generate entrainment of bubbles or non-uniformity, thereby yielding a separator-attached, pressure-sensitive adhesive tape.

Example 2

A homo-polypropylene resin (homo-pp) (trade name: FY4, manufactured by Japan Polychem Corp.), a linear low-density polyethylene (LDPE) (trade name: Sumikasen (transliteration) G-401, manufactured by Sumitomo Chemical Co., Ltd.) and a reactor (polymerizable) thermoplastic olefin-based elastomer (r-TPO resin) (trade name: X500F, manufactured by Sun Allomer Ltd.) were charged at a ratio by weight of the homo-pp/the LDPE/the r-TPO resin of 50/20/30 into an extruder (trade name: GM 30-28 extruder, manufactured by G M Engineering Co.), and then the mixture was molded through a T die into the form of a melt-extruded sheet (thickness: 100 μm). In this way, a sheet-form molded product was obtained.

Next, 100 parts by weight of a HALS-copolymerized HALS hybrid polymer (trade name: HALS Hybrid UV-G300, manufactured by Nippon Shokubai Co., Ltd., hydroxyl value (vanish value): 39±8), 13 parts by weight of a hardener (trade name: Sumijule (transliteration) N-3200, manufactured by Sumitomo Bayer Urethane Co., Ltd.), and a diluting solvent (ethyl acetate) were mixed so that the content by percentage of non-volatile components therein would be 20%. Next, a bar coater was used to apply the mixture, as a hard coating layer material, onto the sheet-form molded product so as to have a thickness of 2 μm after the drying of the mixture. Thereafter, the resultant was dried at 120° C. for 2 minutes, and then subjected to hardening acceleration aging (at 60° C. for 2 days) to yield a resin film.

Next, formed was a separator having a surface subjected to unevenness-forming working ((a): 50 μm, (b): 15 μm, and (c): 450 μm). An applicator was used to coat this concave-convex face with a pressure-sensitive adhesive polymer solution, wherein an acryl-based pressure-sensitive adhesive (2-ethylhexyl acrylate-based pressure-sensitive adhesive, manufactured by Nitto Denko Corp.) and a crosslinking agent (trade name: Coronate L, manufactured by Nippon Polyurethane Industry Co., Ltd.) were mixed (at a ratio of the adhesive to the crosslinking agent of 100/3) so as to set the content by percentage of non-volatile components therein to 20% by weight, in such a manner that the pressure-sensitive adhesive after being dried would have a thickness of 30 μm. Thereafter, the resultant was dried at 100° C. for 2 minutes to form a pressure-sensitive adhesive layer, thereby producing a separator with the pressure-sensitive adhesive layer. The above-mentioned resin film was laminated onto this separator with the pressure-sensitive adhesive layer by means of a laminator, so as not to generate entrainment of bubbles or non-uniformity, thereby yielding a separator-attached, pressure-sensitive adhesive tape.

Comparative Example 1

A separator-attached, pressure-sensitive adhesive tape was formed in the same way as in Example 1 except that instead of the above-mentioned resin film, a vinyl chloride resin sheet (PVC sheet) (substrate for SPV-2008, manufactured by Nitto Denko Corp., thickness: 70 μm) was stuck onto the separator with the pressure-sensitive adhesive layer.

Comparative Example 2

A separator-attached, pressure-sensitive adhesive tape was formed in the same way as in Example 1 except that instead of the above-mentioned resin film, a vinyl chloride resin sheet (PVC sheet) (substrate for SPV-201S, manufactured by Nitto Denko Corp., thickness: 100 μm) was stuck onto the separator with the pressure-sensitive adhesive layer.

Comparative Example 3

A separator-attached, pressure-sensitive adhesive tape was formed in the same way as in Example 1 except that instead of the above-mentioned resin film, a vinyl chloride resin sheet (PVC sheet) (substrate for No. 2101, manufactured by Nitto Denko Corp., thickness: 80 μm) was stuck onto the separator with the pressure-sensitive adhesive layer.

According to the above-mentioned methods, the tensile modulus of each of the above-mentioned tapes was measured, the index-conversed gradient K thereof was calculated, and the bubble-escaping property and the surface roughness thereof were evaluated. The obtained results are shown in Table 1.

TABLE 1

|  |  | Example 1 | Example 2 | Comparative Example 1 | Comparative Example 2 | Comparative Example 3 |
|---|---|---|---|---|---|---|
| Tensile modulus | 23° C. | 510 Mpa | 316 Mpa | 500 Mpa | 403 Mpa | 315 Mpa |
|  | 40° C. | 339 Mpa | 157 Mpa | 95 Mpa | 70 Mpa | 60 Mpa |
|  | 60° C. | 195 Mpa | 90 Mpa | 11 Mpa | 6.5 Mpa | 5.5 Mpa |
|  | 80° C. | 100 Mpa | 40 Mpa | 6 Mpa | 2.8 Mpa | 1.1 Mpa |
| Index-conversed gradient K |  | −0.0286 | −0.0353 | −0.0804 | −0.0902 | −0.1013 |
| Bubble-escaping property |  | ○ | ○ | ○ | ○ | ○ |
| Surface roughness |  | ○ | ○ | x | x | x |

From the results in Table 1, in the case of all the examples using the separator-attached, pressure-sensitive adhesive tape formed by the present invention (Examples 1 and 2), the tensile modulus in the range of 23 to 80° C. was in the range of 30 to 600 MPa and the index-conversed gradient K was a value of −0.05 or more. As a result, even after the tapes were each subjected to heat treatment in the oven of 80° C. temperatures for 24 hours, plastic deformation was restrained and no groove structure was exposed to the external appearance by the transcription of the groove structure of the separator. In all the examples, the bubble-escaping property thereof was not affected and was good even if the concave region width of the groove structure was 450 μm.

On the other hand, in each of Comparative Examples 1 to 3, a good bubble-escaping property was exhibited, but the tensile modulus in the range of 23 to 80° C. was not in the range of 30 to 600 MPa and the index-converted gradient K was a smaller value than −0.05. As a result, plastic deformation was not restrained and a groove structure was exposed to the external appearance by the transcription of the groove structure of the separator after the tape was subjected to heat treatment in an oven of 80° C. temperatures for 24 hours.

Accordingly, it was surely made clear that the pressure-sensitive adhesive tape of the present invention is a pressure-sensitive adhesive tape which is excellent in bubble-escaping property, and is further good in external appearance even after the tape is subjected to high-temperature treatment.

What is claimed is:

1. A pressure-sensitive adhesive tape which comprises a resin film and a pressure-sensitive adhesive layer formed on at least one side of the film, and
   which has a concave-convex form containing plural grooves arranged at given intervals in a face of the pressure-sensitive adhesive layer that is to be stuck onto an adherend, and has a region where the width of the convex region of the grooves is 400-600 μm and the width of the concave region of the grooves is 30-70 μm, the tensile modulus of the pressure-sensitive adhesive tape in the temperature range of 23 to 80° C. being in the range of 30 to 600 MPa.

2. The pressure-sensitive adhesive tape according to claim 1, wherein at the time of plotting the temperature thereof and the tensile modulus thereof along the transverse axis and the vertical axis of a graph, respectively, the index-converted gradient K of the tensile modulus of the pressure-sensitive adhesive tape with a rise in the temperature is −0.05 or more, the gradient K being calculated from the following equation:

$$y = \alpha \times e^{Kx} \quad (1)$$

wherein y represents the tensile modulus (MPa), x represents the temperature (° C.), α represents the index-converted intercept value (MPa), and K represents the index-converted gradient (−).

3. The pressure-sensitive adhesive tape according to claim 1, wherein the resin film has, on at least one side thereof, a thermosetting acryl-based hard coating layer having a thickness of 1 to 20 μm.

4. The pressure-sensitive adhesive tape according to claim 1, wherein the concave region depth of the grooves in the pressure-sensitive adhesive layer is from 15 to 25 μm.

5. A separator-attached, pressure-sensitive adhesive tape according to claim 1, wherein the height of convex regions in a surface of a separator present at the side of the pressure-sensitive adhesive layer of the pressure-sensitive adhesive tape is from 15 to 25 μm, and the width of concave regions therein is from 400 to 600 μm, and the width of the convex regions is from 30 to 70 μm.

6. A separator-attached, pressure-sensitive adhesive tape according to claim 2, wherein the height of convex regions in a surface of a separator present at the side of the pressure-sensitive adhesive layer of the pressure-sensitive adhesive tape is from 15 to 25 μm, and the width of concave regions therein is from 400 to 600 μm, and the width of the convex regions is from 30 to 70 μm.

7. A separator-attached, pressure-sensitive adhesive tape according to claim 3, wherein the height of convex regions in a surface of a separator present at the side of the pressure-sensitive adhesive layer of the pressure-sensitive adhesive tape is from 15 to 25 μm, and the width of concave regions therein is from 400 to 600 μm, and the width of the convex regions is from 30 to 70 μm.

8. A separator-attached, pressure-sensitive adhesive tape according to claim 4, wherein the height of convex regions in a surface of a separator present at the side of the pressure-sensitive adhesive layer of the pressure-sensitive adhesive tape is from 15 to 25 μm, and the width of concave regions therein is from 400 to 600 μm, and the width of the convex regions is from 30 to 70 μm.

9. The pressure-sensitive adhesive tape according to claim 1, wherein the resin film is substantially free of polyvinyl chloride.

10. The pressure-sensitive adhesive tape according to claim 1, wherein the resin film has a thermosetting acrylic hard coating layer on the surface opposite the adhesive layer-side of the resin film.

11. The pressure-sensitive adhesive tape according to claim 1, wherein the resin film comprises a thermoplastic resin.

12. The pressure-sensitive adhesive tape according to claim 3, wherein the thermosetting acryl-derived hard coating layer is a hindered amine light stabilizer (HALS) hybrid polymer.

13. The pressure-sensitive adhesive tape according to claim 1, wherein the grooves are arranged in a structure of continuous lattices.

14. The pressure-sensitive adhesive tape according to claim 1, wherein the resin film is a melt-extruded sheet comprised of homo-polypropylene resin, a linear low-density polyethylene, and a polymerizable thermoplastic olefin elastomer.

15. The pressure-sensitive adhesive tape according to claim 14, wherein the resin film has, on at least one side thereof, a thermosetting acryl-based hard coating layer having a thickness of 1 to 20 μm.

* * * * *